United States Patent [19]

Powell et al.

[11] Patent Number: 4,875,365

[45] Date of Patent: Oct. 24, 1989

[54] METHOD AND APPARATUS FOR MEASURING CUTTING FORCES OF MACHINE TOOL

[75] Inventors: John W. Powell, Raleigh, N.C.; Ted R. Massa, Latrobe, Pa.

[73] Assignee: Kennametal Inc., Latrobe, Pa.

[21] Appl. No.: 251,155

[22] Filed: Sep. 29, 1988

[51] Int. Cl.⁴ .................................................. G01L 5/16
[52] U.S. Cl. ...................................... 73/104; 73/862.38
[58] Field of Search ............ 73/862.04, 862.06, 862.07, 73/862.38, 104

[56] References Cited

U.S. PATENT DOCUMENTS

| | | | |
|---|---|---|---|
| 3,636,760 | 1/1972 | Shoberg | 73/862.04 |
| 3,640,130 | 2/1972 | Spescha et al. | 73/133 |
| 3,771,359 | 11/1973 | Shoberg | 73/862.04 |
| 3,939,704 | 2/1976 | Zipin | 73/862.04 |
| 4,741,231 | 5/1988 | Patterson et al. | 73/862.06 |

FOREIGN PATENT DOCUMENTS 3440670 5/1986 Fed. Rep. of Germany .

Primary Examiner—Stewart J. Levy
Assistant Examiner—Michele Simons
Attorney, Agent, or Firm—Thomas R. Trempus

[57] ABSTRACT

The present invention relates to a method and apparatus for measuring cutting forces associated with a machine tool. A force transducer plate forms a part of a bolted joint within the machine tool structure and is positioned within a direct force path. Raised force shunting pads are formed on both sides of the plate thereby limiting the load transfer area of the plate. At least one three-axis load cell is mounted closely adjacent one force shunting pad and elevated relative to the pad such that an acceptable pre-load is maintained on the load cell. By strategically placing the load cell closely adjacent the force shunting pad and utilizing the force shunting pads to transfer the majority of loads through the plate, hysteresis is minimized, linearity optimized, and the load cell protected from overload.

20 Claims, 3 Drawing Sheets

METHOD AND APPARATUS FOR MEASURING CUTTING FORCES OF MACHINE TOOL

BACKGROUND OF THE INVENTION

1. Field of the Invention

The present invention relates generally to sensing systems for the detection of worn and broken cutting tools in machine tool centers and, in particular, to a new and novel method and apparatus for measuring the cutting forces for such a system.

2. Description of the Prior Art

Modern high-speed machine tools are capable of significant improvements in productivity. However, in order to achieve these gains in productivity, it is necessary to replace human operators with computer numerical control (CNC) systems. Unlike a human operator, a CNC control system does not inherently have means for detection of worn and broken cutting tools. Furthermore, because such systems are designed to remove tremendous amounts of metal in a short period of time, extremely high cutting speeds must be used. As a result, it has become critical that worn and broken cutting tools be detected in order to stop the machine tool before it can inflict considerable damage to itself or its workpiece.

Changes in the tool condition, including wear or breakage, are accompanied by characteristic changes in the cutting forces from "normal" cutting force signals. Tool condition sensor systems use advanced algorithms to detect these characteristic changes. Such systems utilize separate, specialized algorithms to detect wear, breakage and collision, and provide separate outputs to the CNC control for each occurrence.

Tool breakage is a sudden, catastrophic event characterized by distinct changes in force signals. These changes are not a signature per se but are a characteristic sequence of events (i.e. a fingerprint). Thus, as long as the sensor system is capable of detecting the event, it is not necessary that the accuracy of the force measurement be very high. On the other hand, the detection of tool wear requires transducers which have very little hysteresis, very good linearity, and which are extremely stable with respect to movement of the machine slide or changes over time. Thus, the weak link in present day tool condition sensor systems is obtaining good transducer output representative of the cutting forces.

Typically, to measure cutting forces, sensor systems utilize one or more load cells. In machine tool applications, the load at the tool tip can reach 10,000 pounds and, because of lever arm effects, the load on a load cell can be even higher. Thus, it has been necessary to specially modify load cell installation in some manner in order to at least indirectly measure the cutting forces at the tool tip while protecting the load cell from overload and still working within the constraints of the machine structure.

One such system which attempts to meet this criteria is disclosed in German Patent DE No. 3440670 to Kluft. Kluft attempts to measure three-axis cutting tool loads by utilizing a single axis load cell or cells and calculating the three-axis load through moment arm calculations. This method of measuring cutting forces is obviously open to the introduction of significant error. Moreover, because of the dependency on moment arms, the force transducer plate cannot be placed in or even near the plane of the cutting tool. Furthermore, because of variations in moment arm due to changes in the tool tip location for different tools, the calibration of these devices will change with each new tool tip location. Thus, application is limited.

Finally, while Kluft did address load cell overload, it does not address the problems of hysteresis, linearity, and stability which are most common in plate-type force transducers.

Thus, it has become desirable to develop a sensor system for a tool condition monitoring system which must not be constantly recalibrated while, at the same time, providing a signal indicative of the cutting forces which has very little hysteresis, very good linearity and is extremely stable.

SUMMARY AND OBJECTS OF THE INVENTION

The present invention solves the aforementioned problems associated with the prior art by providing a force transducer plate for a tool condition monitoring system suitable for integration into machine structures and for measuring the cutting forces in machine tools. The present invention utilizes three-axis quartz force transducers mounted in a precision flat plate located in a bolted joint of the machine structure which is in the direct force path of the forces to be measured. The principal portion of the measured force is carried by the flat plate with a small portion being carried by one or more three-axis load cells. The upper and lower surfaces of the flat plate are relieved except for raised areas around bolt holes passing through the flat plate. This unique geometry is based on the discovery that if a completely flat plate is used, when a load is applied on the bolts, the surface of the plate will warp and raise up until contact occurs predominantly around the bolts. However, when a machine load is applied, the contact areas of the plate will begin to creep across the surfaces of the plate. These "changing" contact areas have been identified as producing a significant amount of non-linearity and, at times, are not symmetrical in all three directions. Thus, the arrangement of the present invention allows the plate to act as a means for control of the load paths, thereby substantially reducing hysteresis and non-linearity. One or more three-axis load cells are located near the "known" contact area.

Accordingly, a primary object of the present invention is to provide a sensor assembly for a tool condition monitoring system that is capable of accurately measuring cutting forces associated with the tool.

Another object of the present invention is to provide a transducer plate for a tool condition sensing system for machine tools that is capable of reliably detecting worn and broken cutting tools and which is capable of so performing without a trial cut and which requires minimum operator setup.

A further object of the present invention is to provide a force transducer plate for measuring cutting forces associated with a machine tool that minimizes hysteresis and non-linearity.

It is also an object of the present invention to provide a force transducer plate that has three axis load measuring capabilities within the plate itself.

Another object of the present invention is to provide a force transducer plate of the character referred to above that is versatile in application and whose mounting position is not limited by moment arm considerations.

Another object of the present invention is to provide a force transducer plate for measuring cutting forces of a machine tool that directly measures both compression and shear forces within the transducer plate.

Still a further object of the present invention resides in the provision of a force transducer plate of the character referred to above that is capable of being calibrated such that the output of the plate is substantially immune to the position of the load application point.

Still a further object of the present invention is to provide a force transducer plate of the character referred to above that minimizes the effects of adjacent structure flexibility.

A further object of the present invention resides in the provision of a force transducer plate that is provided with pre-load adjustment means that enables the load cells within the force transducer plate or medium to be adjusted to carry a selected pre-load.

Still a further object of the present invention resides in the provision of a relatively simple pre-load adjuster for a force transducer medium of the character referred to above that is suitable for in-field installation and which allows the transducer medium to be machined to specified tolerances without further machining required to establish a particular pre-load.

Other objects and advantages of the present invention will become apparent and obvious from a study of the following description and the accompanying drawings which are merely illustrative of such invention.

DETAILED DESCRIPTION OF THE INVENTION

Figure 1:
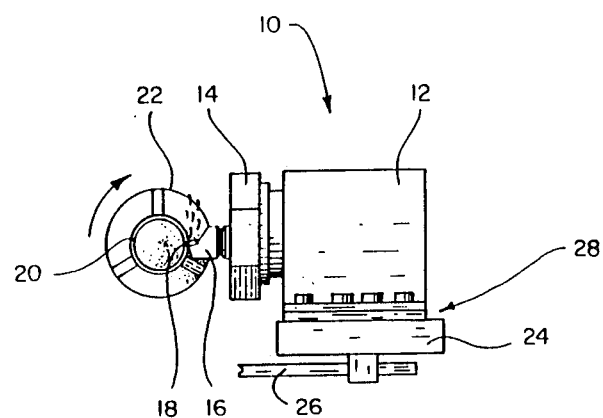
FIG. 1 is a schematic illustration of a machine tool having the transducer medium of the present invention disposed within a bolted joint.

With further reference to the drawings, a machine tool is schematically shown in FIG. 1 and indicated generally by the numeral 10. The present invention entails a system and method for measuring cutting forces associated with the machine tool 10. Before describing the method and apparatus for measuring these cutting forces, a brief description of a typical machine tool that would utilize the present invention will follow.

In this regard, machine tool 10 comprises a turret housing 12 and a turret disk 14 rotatively mounted with respect to the housing 12. A detachable tool holder 16 projects from the turret disk 14 and is adapted to receive and hold a cutting tool 18. A workpiece holder 22 is disposed adjacent tool holder 16 and is designed to receive and hold a workpiece 20. A cross slide 24 is secured to turret housing 12 and is movably mounted on a slide 26.

The present invention entails the provision of a force transducer medium that is secured to or disposed within a machine tool such that cutting forces or loads associated with the cutting tool itself are transferred through the force transducer medium. As will be understood from subsequent portions of this disclosure, the force transducer medium may assume various forms. For example, the force transducer medium may be a plate structure that is secured within a bolted joint of the machine tool. In addition, it will be appreciated that the force transducer medium of the present invention could actually be integrally formed within the machine tool structure itself.

Figure 2:
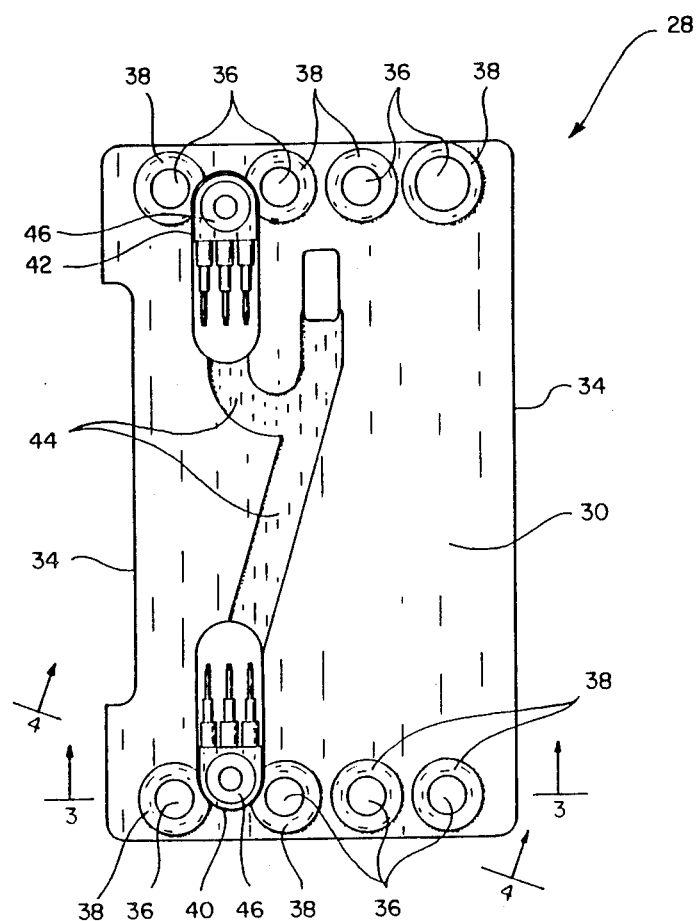
FIG. 2 is a top plan view of the force transducer medium or plate of the present invention.

With respect to the force transducer medium of the present invention, reference is first made to FIGS. 1 and 2. Therein the force transducer medium is in the form of a force transducer plate and is indicated generally by the numeral 28. As shown in FIG. 1, the force transducer plate 28 is bolted between the turret housing 12 and cross slide 24. Thus, it is appreciated that the force transducer plate 28 lies in the direct path of forces associated with the cutting tool itself as these forces are transferred through the machine tool 10 and particularly through the force transducer plate 28.

Viewing force transducer plate 28 in more detail, the same is preferably constructed of steel and includes opposed sides 30 and 32 and a surrounding edge 34. See also FIGS. 3–5. Formed near the perimeter of transducer plate 28 is a series of bolt openings 36. Formed around each bolt opening 36 is a raised force shunting pad 38. As seen in the drawings, it is appreciated that the force shunting pads 38 in the embodiment disclosed are raised annular rings that are elevated with respect to opposed sides 30 and 32 of the transducer plate.

Transducer plate 28 further includes one or more load cell cavities. In the present embodiment force transducer plate 28 includes two load cell cavities 40 and 42 along with associated wiring cavities 44.

Each load cell cavity 40 and 42 is designed to accept a load cell 46. The number and type of load cells 46 can vary depending upon requirements and conditions. But the present invention aims at providing three axis load sensing within the plate or transducer medium itself. In a preferred embodiment of the present invention, the transducer medium would include at least one three axis load cell such as Kistler 9251. As will be appreciated, the transducer plate 28 could be provided with a series of single axis load cells of compression and shear types which would cumulatively form a load cell network that would effectively yield three axis sensing capabilities.

Respective load cells 46 are preferably flexibly mounted within the transducer medium or plate 28 by means of conventional sealant 41 suitable for machine tool applications.

Figure 3:
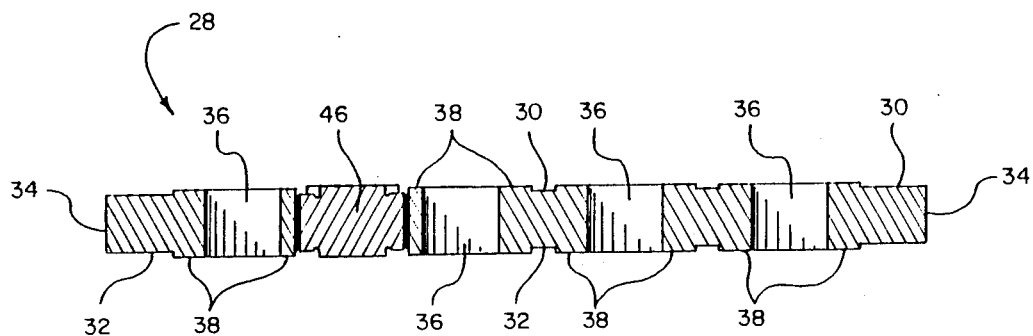
FIG. 3 is a transverse sectional view taken through the lines 3—3 of FIG. 2.

Turning now to FIG. 3, an enlarged sectional view of the transducer plate 28 is shown illustrating the section taken along the line 3—3. As can be seen, the raised force shunting pads 38 extend above both opposed sides 30 and 32 of the plate 28. In a preferred embodiment, the raised force shunting pads 38 extend approximately 0.127 millimeters or 0.005 inches above the surface of sides 30 and 32. This distance is not critical so long as it is sufficient to prevent the bottom surface of turret housing 12 or the upper surface of cross slide 24 from contacting the opposite sides 30 and 32 of the force transducer plate 28 in either loaded or unloaded conditions.

Figure 4:
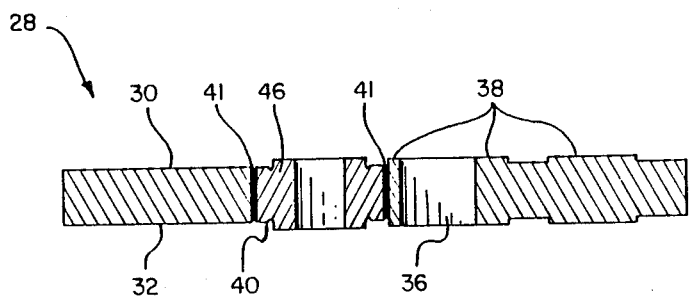
FIG. 4 is a sectional view taken through the lines 4—4 of FIG. 2.

FIG. 4 shows an enlarged sectional view of the transducer plate taken along the line 4—4 in FIG. 2. This sectional view illustrates the relationship between the height of the load cell 46 and the raised force shunting pads 38. In the case of one embodiment, the relative height of the load cell or load cells 46 with respect to the raised force shunting pads 38 is such that the load cell is preloaded appropriately but yet not overloaded. For example, in the case of a Kistler 9251 load cell, the height is selected such that the load placed on the respective load cells will be approximately 4500 pounds. It should be appreciated that the height of the load cell above the raised force shunting pads can and will vary depending on the specific capacity of the load cell and its location with respect to the raised force shunting pads 38. Selection of actual pre-load will vary according to plate design but in any case will have to be great enough to prevent slippage of the load cell under the influence of shear forces. However, it has been found that a difference in height of approximately 0.0127 millimeters or 0.0005 inches is usually sufficient to permit the load cell to be effectively loaded but not overloaded.

There are cases where it is desirable to adjust the relative height of the load cell 46 with respect to the raised force shunting pads 38 in the field and without resorting to machining. To accomplish this, the present invention provides a preload adjuster which is indicated generally by the numeral 50 in FIG. 5 and shown in detail in FIG. 6. Viewing the pre-load adjuster 50 it is seen that the same includes an elongated stem 52 having a circumferential groove 54 formed in a portion thereof. Groove 54 is designed to receive an elastomeric o-ring 56. A fixed disk 58 is attached to one end of stem 52 by means of a fastener 60. Pre-load shims 62 of various selective thicknesses are provided with the pre-load adjuster 50. Each pre-load shim 62 includes a central opening having a sufficient diameter so as to permit stem 52 and the accompanying o-ring 56 to pass therethrough.

Figure 5:
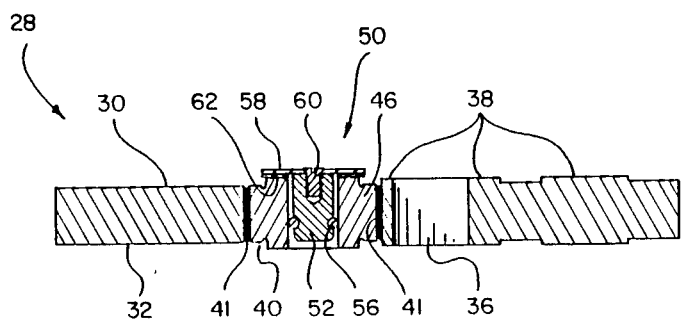
FIG. 5 is essentially the same view as shown in FIG. 4 with the exception that a pre-load adjuster is disposed within the load cell shown.
Figure 6:
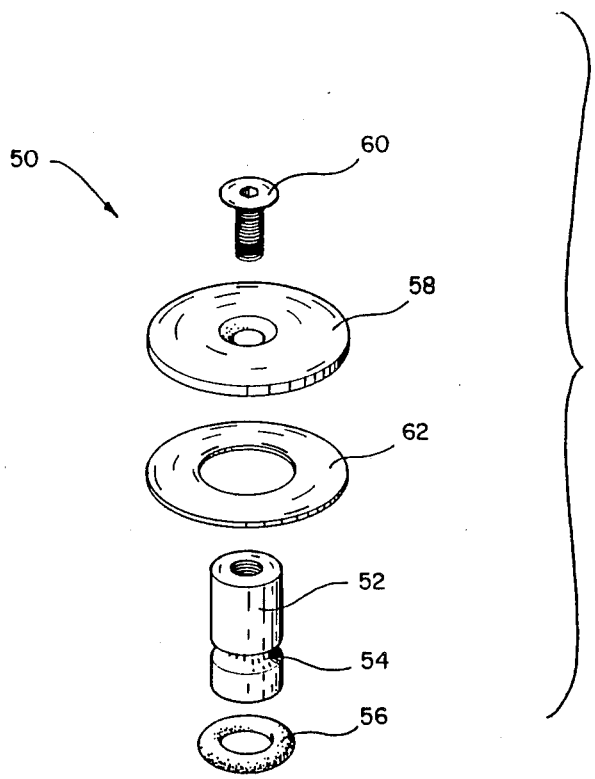
FIG. 6 is perspective exploded view of the pre-load adjuster.

FIG. 5 shows a fragmentary cross-sectional view of the transducer plate 28 showing the pre-load adjuster 50 inserted within a load cell 46. By selectively inserting pre-load shims 62, the height of the load cell 46 with respect to the raised force shunting pads 38 can be varied.

As has been noted above, there are certain applications where the force transducer medium will be integrally formed or pocketed in the machine tool. It is appreciated that the pre-load adjuster 50 can be provided with threads about stem 52 in order that the same can be actually anchored into associated machine tool structure. For example, by providing thread on the stem 52 of the pre-load adjuster 50, the same can be secured in an upside down fashion within the bottom surface of turret housing 12. In such cases, the engagement of the o-ring 56 with the central opening or bore of the load cell will generally be sufficient to support the load cell 46 and hold the same in place for assembly.

Figure 7:
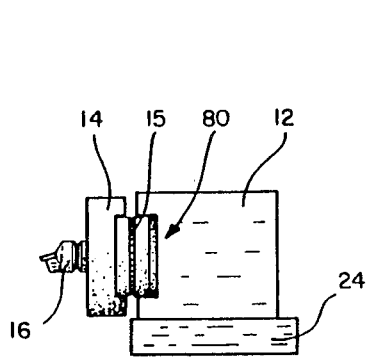
FIG. 7 is a schematic illustration of a machine tool showing the force transducer medium or plate disposed in a different position within the machine tool.
Figure 8:
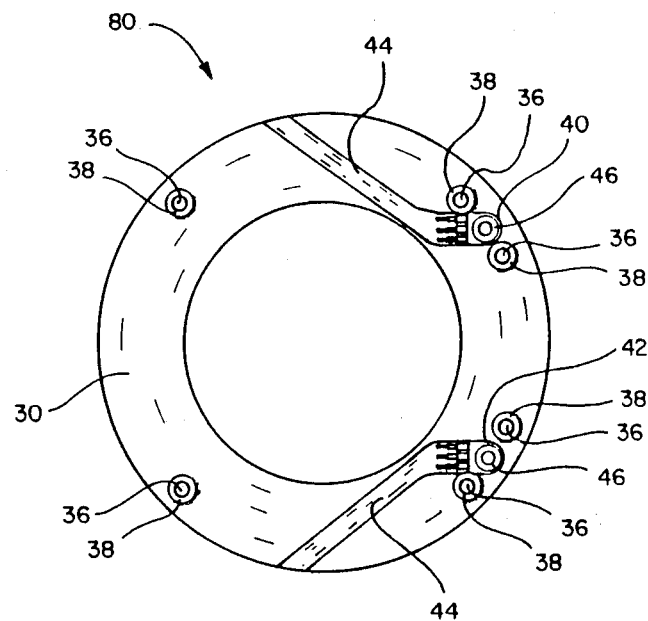
FIG. 8 is plan view of an alternate transducer plate design that is suitable for the application illustrated in FIG. 7.

Turning to FIGS. 7 and 8, an alternative design for the plate type force transducer of the present invention is shown. The alternate force transducer plate is indicated generally by the numeral 80 and is designed to be located directly behind the curvic coupling 15 of the machine tool 10 or between the curvic coupling 15 and the turret housing 12 (See FIG. 7).

The annular force transducer plate 80 is similar in design and function as the force transducer plate shown in FIG. 2 and described above. But as seen in the drawings, the annular force transducer plate is particularly designed to be disposed in a plane generally perpendicular to the plane of the force transducer plate 28 as applied in FIG. 1 where plate 28 lies between the turret housing 12 and the cross slide 24. In any event, it is seen that the annular force transducer plate 80 includes the same series of bolt openings 36 and raised force shunting pads 38. Likewise, the annular force transducer plate includes load cell cavities 40 and 42 along with accompanying wiring cavities 44. A pair of load cells 46 are resiliently mounted within respective load cell cavities. The relationship between the load cells 46, raised force shunting pads 38 and the opposite sides of the annular transducer plate 80 are essentially the same as found in the force transducer plate 28 shown in FIG. 2.

It is seen that in the force transducer medium or plate that the respective load cells 46 are positioned as closely as possible to the raised force shunting pads. This tends to minimize hysteresis and optimizes linearity.

As noted before, the force transducer medium that has been particularly shown in the form of a plate structure could be integrally formed within the machine tool itself. Essentially, the force transducer medium would include the same features, namely the raised force shunting pads and the selective positioning of the load cells adjacent to the raised force shunting pads. It is appreciated that the relative height differences discussed with respect to the plate structures 28 and 80 would be applicable to an integral or pocketed force transducer medium.

In operation, a principal portion of the measured force is carried by the force transducer plate or medium via the raised force shunting pads 38 while a small portion is carried by the three axis load cell 46 which in turn provides a cutting force signal which is indicative of the forces applied to the cutting tool 18. Therefore, the load passing through the transducer plate or medium is effectively divided between the plate or medium and the respective load cells housed within the plate or medium. Consequently, this enables one to protect against load cell overloading.

In addition, the proportionate amount of load sensed or carried by the respective load cells can be varied depending upon a number of factors including the relative area and location of the raised force shunting pads 38 as shown in FIG. 2.

From the foregoing specification and discussion, it is appreciated that the force transducer plate or medium of the present invention is capable of accurately measuring cutting forces associated with a cutting tool. The present method and system is capable of performing without a trial or turning cut and requires a minimum amount of setup time. Because of the design of the raised force shunting pads and the particular location and height spacing of the load cells with respect to the force shunting pads, hysteresis is minimized and linearity is optimized.

With the design of the present invention, both compression and shear forces are actually measured within the transducer plate or medium and the design does not rely on moment arms in order to measure cutting forces associated with the tool.

Also, because of the design and spacing of the raised force shunting pads and the location of the respective load cells with respect to the same, the output of the force transducer plate or medium is substantially immune to load application point.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A plate-type force transducer for measuring cutting forces in a bolted joint of a machine tool comprising:
   (a) a plate having first and second sides;
   (b) a series of bolt openings formed in the plate for receiving bolts that permit the plate to be secured within the joint;
   (c) raised force shunting pads formed about the bolt openings on both sides of the plate and elevated relative to the sides of the plate such that when the plate forms a part of the joint the raised force shunting pads actually engage adjacent bearing surfaces of the joint while the sides of the plate are at least slightly spaced from the adjacent bearing surfaces of the joint;
   (d) at least one load cell cavity formed in the plate closely adjacent at least one bolt opening;
   (e) a load cell mounted in the cavity and having a loading surface raised slightly above the surface of the raised force shunting pads such that the load cell is appropriately pre-loaded but not overloaded.

2. The plate-type force transducer of claim 1 including means for varying and adjusting the effective height of the load cell with respect to the raised force sensing pads.

3. The plate-type force transducer of claim 2 wherein the height adjustment means includes at least one shim and means for securing the shim to the loading surface of the load cell.

4. The plate-type force transducer of claim 2 wherein the load cell includes an opening and wherein the height adjustment means includes a stem adapted to be inserted into the opening of the load cell, a retainer secured to the stem, and shim means secured to the stem by the retainer and normally disposed adjacent the loading surface of the load cell.

5. The plate-type force transducer of claim 1 including a plurality of load cell cavities formed within the plate structure with each being disposed closely adjacent a bolt opening, and wherein there is provided a plurality of load cells mounted within the load cell cavities.

6. The plate-type force transducer of claim 1 wherein the load cell mounted within the plate includes means for measuring forces along three orthogonal axes.

7. The plate-type force transducer of claim 1 wherein the plate includes bolt openings and accompanying raised force shunting pads about opposed portions of the plate; and wherein there is provided at least two load cells with the load cells being spaced apart and disposed about opposite portions of the plate and with each load cell being mounted closely adjacent to at least one raised force shunting pad.

8. A method of measuring cutting forces associated with a machine tool that minimizes hysteresis and non-linearity comprising:
   (a) positioning a force transducer medium in a direct force path of the machine tool;
   (b) directing cutting forces from the machine tool to the force transducer medium;
   (c) directing cutting forces through the medium at spot locations on the medium and leaving a substantial area of the medium load-free;
   (d) positioning a load cell closely adjacent at least one load carrying spot location on the medium; and
   (e) directing a portion of the cutting forces through the load cell disposed adjacent the load carrying spot location and measuring those cutting forces passing through the load cell while at the same time transferring another portion of the cutting forces through the load carrying spot location, thereby minimizing hysteresis and non-linearity because of the select spot loading and the location of the load cell with respect to the spot loading.

9. The method of claim 8 wherein the medium comprises a transducer plate and the method further includes the steps of:
   (a) bolting the force transducer medium within a joint;
   (b) raising the surface of the transducer medium around bolt opening such that the cutting forces associated with the machine tool are transferred through the raised surfaces and not the surrounding lower surface of the medium; and
   (c) positioning the load cell closely adjacent at least one raised surface such that the total load transferred through the force transducer medium is transferred through the raised surface areas of the medium and the adjacent load cell.

10. The method of claim 9 including the step of elevating the effective loading surface of the load cell to a height slightly greater than the height of the raised surface area of the force transducer medium.

11. The method of claim 10 including the step of varying and adjusting the effective height of the load cell by adding shims to the load cell or removing shims from the load cell.

12. The method of claim 8 including the step of measuring cutting forces in three separate orthogonal axes within the force transducer medium.

13. A force transducer medium for measuring cutting forces associated with a machine tool comprising:
   (a) a force transducer medium adapted to assume a position in a direct force path of a machine tool;
   (b) spot load transfer means forming a part of the force transfer medium for transferring a first portion of the cutting force loads through spot areas of the force transducer medium; and
   (c) load cell means mounted in the force transducer medium directly adjacent the spot load transfer means for carrying a second portion of the cutting force loads and for measuring those cutting forces associated with the machine tool passing through the load cell and wherein the transfer of cutting force through the spot areas coupled with the close placement of the load cell means with respect to the spot transfer areas gives rise to decrease hysteresis and improves linearity.

14. The force transducer medium of claim 13 wherein the force transducer medium includes a force transducer plate having opposed sides with a series of bolt openings formed therein; raised force shunting pads on both sides of the medium around the bolt openings for transferring a substantial portion of the cutting force load through the medium while leaving a substantial portion of the medium load free; a load cell cavity formed closely adjacent at least one raised force shunting pad; and wherein the load cell is mounted within the load cell cavity.

15. The force transducer medium of claim 14 wherein the load cell means includes means for measuring cutting forces in three orthogonal axes such that both compression and shear force can be directly measured within the medium.

16. The force transducer medium of claim 15 wherein the load cell includes a load engaging surface that is disposed approximately 0.0005 inches above the raised force shunting pads.

17. The force transducer medium of claim 16 wherein the raised force shunting pads are elevated at least approximately 0.005 inches above the underlying surface of the transducer medium.

18. The force transducer medium of claim 13 wherein the load cell means is of the type having a central opening and wherein there is provided a load cell pre-load adjuster comprising:
 (a) a stem adapted to be secured within the opening of the load cell;
 (b) a retainer normally connected to one end portion of the stem; and
 (c) shim means confined about the stem and normally positioned between the retainer and the load cell for adjusting the effective height of the load cell with respect to the raised force shunting pads.

19. The force transducer medium of claim 18 wherein the pre-load adjuster includes an o-ring formed about the stem and wherein the retainer includes a disk secured to an end of the stem by a screw.

20. The force transducer medium of claim 13 including means for varying the effective height of the load cell.

* * * * *